United States Patent [19] [11] 3,755,156
Yakovlev et al. [45] Aug. 28, 1973

[54] METHOD FOR BIOCHEMICAL TREATMENT OF INDUSTRIAL WASTE WATER

[76] Inventors: Sergei Vasilievich Yakovlev, Festivalnaya ulitsa, 3, kv. 88; Jury Viktorovich Voronov, B. Serpukhovskaya ulitsa, 56, kv. 58; Vladimir Nikolaevich Korenkov, Samarkandsky bulvar, 32, korpus 1, kv. 51, all of Moscow; Alexandr Borisovich Nevsky, poselok Dzerhinskogo, ulitsa Lermontova, 7, kv. 20, Moskovskaya Oblast; Valentina Andreevna Dobrikova, Gospitalny val 5, korpus 15, kv. 24; Tamara Alexandrovna Karjukhina, Novokuznetskaya ulitsa, 43/16, kv. 61; Ira Nikolaevna Churbanova, I Kuryanovskaya ulitsa, 57, kv. 42; Jury Mikhailovich Laskov, Kuryanovsky bulvar, 14, kv. 2, all of Moscow, U.S.S.R.

[22] Filed: May 4, 1971
[21] Appl. No.: 140,205

[52] U.S. Cl............ 210/5, 210/16, 210/50, 210/60, 210/63
[51] Int. Cl............ C02c 1/06, C02c 1/40
[58] Field of Search............ 210/2-7, 210/11, 15, 16, 18, 50, 59-63

[56] References Cited
UNITED STATES PATENTS
2,134,679 11/1938 Allen ........................ 210/63 X
2,452,928 11/1948 Hampel ...................... 210/62
3,294,680 12/1966 Lancy ........................ 210/50 X
3,530,067 9/1970 Friedman .................... 210/59 X
3,573,202 3/1971 Sobota et al. ................ 210/6 X Primary Examiner—Samih N. Zaharna
Assistant Examiner—Thomas G. Wyse
Attorney—Holman & Stern

[57] ABSTRACT

A method for biochemical treatment of industrial waste water containing combined oxygen in the form of inorganic compounds of hexavalent chromium, chlorine or mixtures of said compounds, in which said industrial waste water is mixed with municipal sewage containing organic matter and in which said municipal sewage is subject to mechanical purification from contaminants present therein. The mixed water is thereafter fed to an unaerated tank, wherein biochemical reduction of said inorganic oxygen-containing compounds through the use of activated sludge as well as biochemical oxidation of organic matter are effected simultaneously. Biochemical reduction of inorganic oxygen-containing compounds having been effected, the mixed water together with the activated sludge is delivered from the unaerated tank to a settler and the precipitated sludge adapted to said inorganic oxygen-containing compounds is returned to said unaerated tank. The herein-disclosed method provides for treatment of industrial waste water featuring higher concentration of inorganic oxygen-containing compounds of chromium and chlorine as well as for a more intensified process of reduction of said compounds.

11 Claims, 1 Drawing Figure

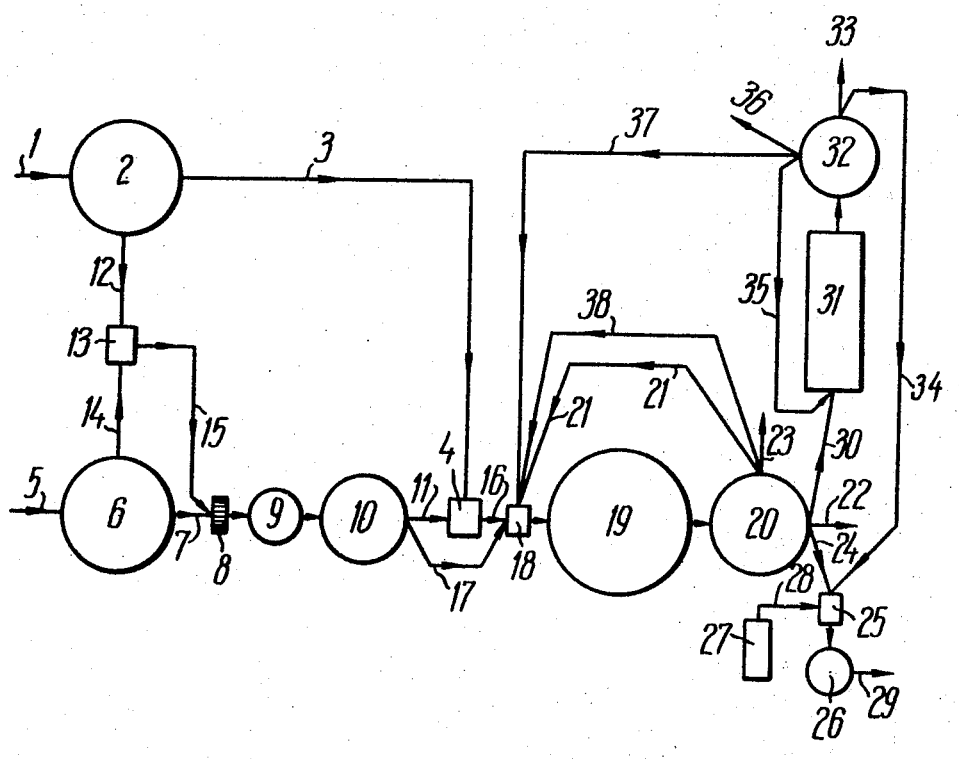

METHOD FOR BIOCHEMICAL TREATMENT OF INDUSTRIAL WASTE WATER

The present invention relates to methods for biochemical treatment of industrial waste water containing combined oxygen in the form of inorganic compounds of hexavalent chromium, chlorine or mixtures thereof. Said industrial waste water originating mostly from the operation of chemical plants and the iron industry are toxic and therefore not allowed to be drained to receiving waters without purification.

Known in the present state of the art is a method for activated sludge treatment of industrial waste water containing combined oxygen in the form of inorganic compounds of hexavalent chromium. The method consists in a concurrent use of industrial waste water and municipal sewage which contain inorganic matter. The mixture thus obtained is fed first to a mechanical purifier and then to the unaerated tank to effect simultaneous biochemical reduction of said chromium oxygen-containing compounds by the activated sludge system and oxidation of organic matter. The effluent from the unaerated tank is fed to an aeration tank for additional purification and then to a settler to be settled.

In the above-disclosed method the reduction of hexavalent chromium to trivalent chromium is effected in the unaerated tank mainly by the activated sludge supplied from the settler installed beyond the aeration tank.

The disadvantages of the heretofore-known method are low chromium reduction rate, insufficient degree of purification, low initial chromium concentration in the effluent (50 mg/l maximum) and the precipitation of the reduced chromium compounds in the activated sludge system.

It is primary object of the present invention to provide a method for biochemical treatment of industrial waste water which will intensify the process of reduction of chromium and chlorine inorganic oxygen-containing compounds.

It is another object of the present invention to provide a method for biochemical treatment that will make it possible to purify industrial waste water with a higher concentration of oxygen-containing compounds, the only limitation imposed being in the amount of organic matter present in the mixture of industrial waste water and municipal sewage after mechanical purification thereof.

In accordance with these and other objects, the present invention relates to a method in which industrial waste water which contains combined oxygen in the form of inorganic compounds of hexavalent chromium, chlorine or mixtures thereof, is mixed with municipal sewage containing organic matter; and the thus-obtained mixture is subjected to mechanical purification. Also, the municipal sewage may purified mechanically prior to be mixed with said industrial waste water. Further, the mixture is fed to an unaerated tank to effect simultaneous biochemical reduction of said inorganic oxygen-containing compounds by the activated sludge and biochemical oxidation of the organic matter. According to the present invention, the industrial waste water is to be taken in such a proportion to the municipal sewage that the biological oxygen demand (hereinafter referred to as BOD) of the mixture fed to the unaerated tank exceeds the amount of combined oxygen in the form of inorganic matter by an amount not less than 20 mg per litre; after biochemical reduction of inorganic oxygen-containing compounds the mixture together with the activated sludge is delivered from the unaerated tank and fed to the settler, while the precipitated activated sludge, adapted to the above-mentioned inorganic oxygen-containing compounds, is returned to the unaerated tank.

The introduction of the settler arranged beyond the unaerated tank makes it possible to obtain the activated sludge adaptable to chromium and chlorine inorganic oxygen-containing compounds. The fact that the activated sludge utilizes only the combined oxygen proves it the most practicable in the process of biochemical reduction of said oxygen-containing compounds. The redox process occurring inside the unaerated tank proceeds more vigorously in the presence of the above mentioned microflora.

The biochemical redox process proceeds to the end when the mixture of the industrial waste water and the municipal sewage feature combined oxygen in the amount proportional to that of easily oxidizable organic matter with a slight excess of the latter. The excess amount of the easily oxidizable organic matter provides for more complete and rapid reduction of chromium and chlorine oxygen-containing compounds.

In case of the necessity to accomplish the disinfection of aqueous effluents prior to draining them down to receiving waters, the mixture of industrial waste water and the municipal sewage from the abovementioned settler is fed to the disinfection facilities.

To provide re-purification of mixed water from organic matter when its amount in the mixture considerably exceeds that of combined oxygen in the form of inorganic oxygen-containing compounds of chromium, chlorine or a mixture thereof, the mixed industrial waste water and the municipal sewage is fed beyond the settler to expose the organic matter left in the mixture to aerobic biochemical oxidation, whereupon the activated sludge or the biological film is allowed to settle down, the activated sludge being returned to the stage of aerobic biochemical oxidation.

If the need arises to accomplish disinfection of the aqueous effluent prior to draining it down to receiving waters following full biochemical purification, the mixed industrial waste water and the municipal sewage, after removing the activated sludge or the biological film therefrom, is fed to the disinfection facilities.

If the amount of combined oxygen in the mixed aqueous effluent delivered to the unaerated tank exceeds BOD, with a view to increasing the amount of oxidized organic matter in the case of treating industrial waste water which contains combined oxygen in the form of chlorine inorganic compounds, the excess activated sludge is returned from the settler arranged beyond the unaerated tank, to the above mentioned unaerated tank. If said procedure fails, the excess activated sludge available from the settler arranged beyond the unaerated tank, as well as the excess activated sludge or biological film available from the settler arranged beyond the stage of aerobic biochemical oxidation, is fed to the unaerated tank.

At lower BOD of the mixed industrial waste water and the municipal sewage as compared with the amount of combined oxygen available in the form of chromium inorganic compounds, the excess activated sludge or the biological film from the settler arranged beyond the stage of aerobic biochemical oxidation, is fed to the unaerated tank.

For a better removal of chromic hydroxide produced when treating industrial waste water in the process of reduction of chromium inorganic oxygen-containing compounds, the pH value of the mixed aqueous effluent in the settler after passing the unaerated tank, is maintained at a value equal to 9.5–10.

The invention will be described hereinbelow by way of an exemplary embodiment thereof with due reference to the accompanying drawing which represents a flow sheet of a system of an industrial waste water treatment.

According to the flow sheet, the industrial waste water runs through a pipe 1 into a reception-averaging tank 2, from which through a pipe 3 said water is fed to a mixing tank 4 to be mixed with the municipal sewage which has been purified mechanically. To provide mechanical purification of the municipal sewage, the latter is fed through pipe 5 into a reception tank 6, and further, through a pipe 7 to the mechanical treatment means incorporating, for example, a grate 8, sand trap 9 and settler 10. Further, the municipal sewage through pipe 11 is fed to the mixing tank 4. In addition, the industrial waste water having passed the reception-averaging tank 2 may be fed through a pipe 12 to a mixing tank 13 to be mixed there with the municipal sewage delivered through a pipe 14 from the reception tank 6. The mixed industrial waste water and the municipal sewage through the pipe 15 are fed to the mechanical treatment means which incorporate said grate, sand trap and settler.

The mixed industrial waste water and the municipal sewage after having passed the mixing tank 4 through the pipe 16 or through a pipe 17, in case of mechanical treatment, are fed to the biological circulating device, which includes a mixing tank 18 for the adapted activated sludge, an unaerated tank 19 and a settler 20. The activated sludge adapted in the unaerated tank 19 to chromium and chlorine oxygen-containing compounds is returned through a pipe 21 to the stage of biochemical redox process, for which purpose it is fed to the mixing tank 18 or directly to the unaerated tank 19, the feed of the adapted activated sludge directly to said unaerated tank not being shown in the drawing. In the unaerated tank 19 combined oxygen available from organic matter is utilized by the microorganisms of the activated sludge to oxidize organic contaminants present in the mixed water. This is accompanied by the growth of the activated sludge with the resultant increased mass thereof. To remove the activated sludge from the mixed water having been purified from the oxygen-containing compounds, use is made of a settler 20, where, due to weight differences precipitation of both the adapted activated sludge required for the oxidation-reduction process, and the excess activated sludge, occurs. The water thus purified runs through a pipe 22, whereas the excess activated sludge is drained down through a pipe 23.

The purified water may be disinfected for which purpose it is to be fed through pipe 24 to the disinfection facilities incorporating, for example, a mixing tank 25, a contact container 26, and a tank 27 to keep chlorine water, from which it is delivered through a pipe 28 to the mixing tank 25.

In the contact container the disinfectant (chlorine) kills the pathogenic microorganisms, thereby disinfecting the water under treatment. Moreover, disinfection may be effected through the use of chlorinated lime, ozone, hypochlorite and the like.

After having been treated in the disinfection facilities the water makes its way through a pipe 29.

When the necessity arises to repurify the water from organic contaminants, it is delivered from the settler 20 of the biological circulation device and fed through a pipe 30 to the aerobic biochemical means which includes, for example, a biological oxidizing means 31 (aeration tank of biofilter) and a settler 32. The repurified water runs through a pipe 33 or is fed through a pipe 34 to the above-mentioned disinfection facilities.

In the biological oxidizing means 31 the residual unoxidized organic matter, after reduction of combined oxygen in the unaerated tank 19, is air-oxidized due to vital activity of the aerobic microorganisms (activated sludge or biological film). The latter are separated from the pre-treated water in the settler 32. The required amount of the activated sludge is returned to the aeration tank through a pipe 35, whereas the excess activated sludge or the biological film is drained through a pipe 36.

In case of purification of the industrial waste water from chromium oxygen-containing compounds and when the necessity arises to increase BOD, it is advantageous that an excess amount of the activated sludge or biological film from the settler 32 of the aerobic biochemical means be fed through a pipe 37 to the mixing tank 19 of the biological circulation means. The feed of said microflora may be effected directly into the unaerated tank 19.

When it is required to increase BOD in the presence of chlorine oxygen-containing compounds (chlorates and perchlorates, perchloric and hypochlorous acids) it is practicable to feed both the excess activated sludge or biological film from the settler 32 of the aerobic biochemical treatment means through the pipe 37 and the excess activated sludge from the settler 20 of the biological circulation means through the pipe 38 into the mixing tank 18 of the biological circulation means. The feed of the above-mentioned microflora may be effected directly into the unaerated tank 19.

The invention will be more apparent from a detailed consideration of the examples given hereinbelow which illustrate the treatment procedure of the industrial waste water.

EXAMPLE 1

Industrial waste water, containing ammonium perchlorate, was fed to the reception-averaging tank 2, wherein said water was averaged with respect to concentration of ammonium perchlorate and was fed to the mixing tank 4.

Municipal sewage was fed to the reception tank 6, through the mechanical treatment means (grate 8, sand trap 9 and settler 10) and was mixed with the averaged industrial waste water in the mixing tank 4 in such a proportion that BOD of the mixed water exceeded the amount of combined oxygen in ammonium perchlorate by not less than 20 mg per litre (with BOD of the mixed water equal to the amount of combined oxygen available, the process of treating the mixed water from the toxic perchlorate ion takes much time).

In the herein-considered example BOD of the municipal sewage, after passing the mechanical treatment means, amounted to 100 mg/l, and the ammonium perchlorate concentration in the averaged industrial waste water, was 424 mg/l. In the mixing tank 4 BOD of the mixed water was brought to a value of 80 mg/l, with ammonium perchlorate concentration of 85 mg/l and combined oxygen in the mixed water in the amount of 46.5 mg/l. This was achieved by feeding 250 l of the industrial waste water per cubic metre of the municipal sewage. Further, the mixture of the industrial waste water and municipal sewage passed through the biological circulation device, being successively fed to the mixing tank 18, the unaerated tank 19 and the settler 20. In the mixing tank 18 to the mixture of the industrial waste water and the municipal sewage was added the adapted activated sludge fed through the pipe 21 from the settler 20. Sludge concentration in the unaerated tank 19 with respect to dry substance amounted to 3.2 g/l, and purification time was 4.5 hr. During that time interval the activated sludge utilized the combined oxygen of perchlorate ion to oxidize the organic matter available from the municipal sewage. In the settler 20 for the time interval of 1.5 hr the activated sludge, adapted to the combined oxygen of ammonium perchlorate, precipitated from the water being treated and thereafter was returned to the mixing tank 19 in the amount sufficient to maintain the concentration in the unaerated tank of the order of 3.2 g/l. The water leaving the settler 20, featured BOD equal to 33 mg/l and contained 5 mg/l of ammonium perchlorate. Chloride concentration in the purified water, as compared with the primary mixture of the industrial waste water and municipal sewage, increased by 25 mg/l.

In view of the permissible draining of water with BOD equal to 33 mg/l, the drain water was fed to the receiving water through the pipe 22, or through the pipe 24 by which it was fed to be disinfected, whereupon it was fed through the pipe 29 to the receiving water. To obtain lower BOD of the mixture of the industrial waste and the municipal sewage, said mixture was delivered from the settler 20 and through the pipe 30 it was fed to the aerobic biochemical means. After having been repurified by the biofilter 31 and allowed to precipitate in the settler 32 for 15 hours, the BOD of the purified water amounted to 13 mg/l, whereas the concentration of ammonium perchlorate was 3 mg/l. Said water was drained to receiving waters through the pipe 33. If the purified water required disinfection, it was delivered from the settler 32 and through the pipe 34 was fed to the disinfection means and thereafter was drained to the receiving waters through the pipe 29.

EXAMPLE 2

The industrial waste water, containing ammonium perchlorate, was fed through the pipe 1 to the reception-averaging tank 2 wherein it was averaged with respect to the concentration of ammonium perchlorate, and from which it was fed to the mixing tank 13 through the pipe 12. The municipal sewage was fed through the pipe 5 to the reception tank 6, from which through the pipe 14 it was fed to the mixing tank 13 to be mixed there with the averaged industrial waste water. The mixture of the industrial waste water and the municipal sewage passed from the mixing tank 13 through the pipe 15 to the mechanical treatment device including the grate 8, sand trap 9 and settler 10. BOD of the mixture of the industrial waste water and the municipal sewage passed by the mechanical treatment device was 98 mg/l and concentration of ammonium perchlorate was 142 mg/l, which corresponds to amount of the combined oxygen in the mixture of 78 mg/l.

The mixture of the industrial waste water and the municipal sewage from the mechanical treatment device was fed through the pipe 17 to the biological circulation device, and successively through the mixing tank 18, the unaerated tank 19 and the settler 20. In the mixing tank 18 there was added to the mixture of the industrial waste water and the municipal sewage the activated sludge fed thereto from the settler 20 through the pipe 21. The mixture of the industrial waste water and the municipal sewage was maintained in the unaerated tank 19 for 9 hours; the concentration of the activated sludge with respect to dry substance in the above-mentioned tank was 3.02 g/l. After precipitating in the settler 20 for 1.5 hours the purified water had a BOD of 14.8 mg/l, a concentration of ammonium perchlorate of 13.0 mg/l with the increased concentration of chlorides in the purified water increased by 36 mg/l with respect to their concentration in the mixed water beyond the settler 10. The purified water was drained to the receiving waters through the pipe 22.

EXAMPLE 3

The industrial waste water and the municipal sewage with the initial characteristics as described in example 2, was treated according to the procedure of example 2, the only exception being that the mixed water beyond the settler 20, instead of being drained to the receiving waters, was fed to the aerobic biochemical means which incorporates the biofilter 31 and the settler 32. The biological film precipitated in the settler 32 was returned through the pipe 37 to the mixing tank 18 of the biological circulation means. In this case, BOD of the mixture of the industrial waste water and the municipal sewage before the unaerated tank was increased from 98 up to 120 mg/l, with a concentration of ammonium perchlorate of 142 mg/l. Further, the mixed water with BOD equal to 120 mg/l was fed to the biological circulation means, and successively through the mixing tank 18, the unaerated tank 19 and the settler 20. The mixed water was kept in the unaerated tank 19 for 8 hours, with the concentration of adapted activated sludge with respect to dry substance, of 3.02 mg/l. After the mixed water precipitated in the settler for 1.5 hr, its BOD was equal to 40 mg/l, with a concentration of ammonium perchlorate of 3 mg/l and a concentration of chlorides increased by 43 mg/l as compared with the concentration in the mixed water in the settler 10. Further, the mixed water with BOD equal to 40 mg/l passed from the settler 20 to the aerobic biochemical treatment means. After passing the abovementioned means the mixed water had a BOD equal to 10 mg/l with an ammonium perchlorate content of 3 mg/l. The purified water was drained to the receiving waters through the pipe 33.

EXAMPLE 4

The industrial waste water containing potassium chromate, was fed to the reception-averaging tank 2 and further through the pipe 3 to the mixing tank 4, wherein it was mixed with the municipal sewage fed through the pipe 11 and having been preliminarily passed through the reception tank 6 and the mechanical treatment means. In this case BOD of the mixed water beyond the mixing tank 4 was 100 mg/l, with a potassium chromate concentration with respect to chromium of 60 mg/l and combined oxygen of 75 mg/l. The mixed water from the mixing tank 4 was fed through the pipe 16 to the biological circulation means, and successively through the mixing tank 18, wherein the activated sludge adapted to chromate was added thereto through the pipe 21, then through the unaerated tank 19, wherein the mixed water was maintained for 7 hours and the settler 20, wherein both the activated sludge adapted to chromate, and chromic hydroxide were allowed to precipitate from the purified water for 1.5 hours. In this case the residual concentration of chromic hydroxide in the purified water with respect to chromium amounted to 20 mg/l and BOD of the purified water was 20 to 30 mg/l. When it was necessary to decrease the content of chromic hydroxide in the purified mixed water, the value of pH in the settler 20 was maintained equal to 9.5–10 by adding caustic alkali. The residual concentration of chromic hydroxide at pH equal to 9.5 and while precipitating in the settler 20 for 1.5 hr tended to decrease from 20 to 0.4–1.1 mg/l. The purified water was drained to the receiving waters through the pipe 22. The adapted activated sludge from the settler 20 was returned through pipe 21 to the mixing tank 18, while the excess activated sludge together with chromic hydroxide was drained through the pipe 23.

EXAMPLE 5

Industrial waste water with high content of $NaClO_3$ and $NH_4ClO_4$ was fed through the pipe 1 to the reception-averaging tank 2 and further through the pipe 12 to the mixing tank 13. The municipal sewage through the pipe 5 was fed to the reception tank 6 to be mixed with the averaged industrial waste water in the mixing tank 13. Further, the mixed water was fed to the mechanical treatment means, passing successively through the grate 8, the sand trap 9 and the settler 10, from which through the pipe 17 it was fed to the biological circulation means. Concentration of $NaClO_3$ in the mixed water amounted to 250 mg/l, while that of $NH_4ClO_4$ was 1.5 mg/l. The adapted activated sludge was fed to the mixing tank 18 through the pipe 21 from the settler 20 of the biological circulation device.

The mixed water from the settler 20 was fed to the aerobic treatment means incorporating the biofilter 31 and the settler 32 and thereafter it was drained through the pipe 33 to the receiving waters. The excess biological film from the settler 32 was fed through pipe 37 to the mixing tank 18 to increase BOD of the mixed water fed to the unaerated tank 19.

In the herein-considered example the amount of the biological film with respect to dry substance amounted to 10 mg/l. When the mixed water under treatment was maintained in the unaerated tank 19 for 48 hrs and was allowed to be precipitated in the settler 20 for 1.5 hours there was no $NaClO_3$ in the mixed water at all and the content of $NH_4ClO_4$ was not in excess of 5 mg/l. The purified water through the pipe 30 was fed to the aerobic biochemical treatment means, after which BOD of the purified water was not in excess of 15–20 mg/l. The purified water was drained to the receiving waters through the pipe 33.

What we claim is:

1. A method for biochemical treatment of industrial waster water containing inorganic compounds selected from the group consising of chlorates, perchlorates, chromates, and mixtures thereof which comprises mixing said industrial waste water with municipal sewage containing organic matter, purifying by mechanical means said municipal sewage from contaminants present therein, feeding the mixed water to an unaerated tank, the mixing of the industrial waste water and the municipal sewage being accomplished so that the biological oxygen demand of the water being fed to said unaerated tank exceeds the amount of oxygen in said inorganic compounds by not less than 20 mg/l in said unaerated tank into which the mixture of industrial waste water and the municipal sewage is fed, reducing biochemically said inorganic compounds by means of activated sludge recycled from a settler and oxidizing biochemically the organic matter present, feeding the mixture of said industrial waste water and the municipal sewage together with the activated sludge to a settler and returning precipitated sludge adapted to said inorganic oxygen-containing compounds from said settler to said unaerated tank.

2. A method as claimed in claim 1, wherein said industrial waste water and municipal sewage are mixed followed by mechanical purification of the mixed water.

3. A method as claimed in claim 1, wherein the municipal sewage is subjected to mechanical purification followed by mixing with said industrial waste water.

4. A method as claimed in claim 1, wherein the mixture of the industrial waste water and the municipal sewage is delivered from the settler to be disinfected.

5. A method as claimed in claim 1, wherein the mixture of the industrial waste water and the municipal sewage is delivered from the settler to the aerobic biochemical oxidation of the residual organic matter and microflora is precipitated and removed from the mixed water, the activated sludge being returned to the stage of aerobic biochemical oxidation.

6. A method as claimed in claim 5, wherein the mixture of the industrial waste water and the municipal sewage after removing from the microflora is disinfected.

7. A method as claimed in claim 1, wherein when said inorganic compounds are chlorates, perchlorates, or mixtures thereof the excess activated sludge from the settler arranged beyond the unaerated tank, is fed to said tank.

8. A method for biochemical treatment of industrial waste water containing inorganic compounds selected from the group consisting of chlorates, perchlorates, and mixtures thereof, which comprises mixing said industrial waste water with municipal sewage containing organic matter, purifying by mechanical means said municipal sewage from contaminants present therein, feeding the mixed water to an unaerated tank, the mixing of the industrial waste water and the municipal sewage being effected so that biological oxygen demand of the mixed water being fed to said unaerated tank exceeds the amount of oxygen in said inorganic compounds by not less than 20 mg/l in said unaerated tank into which the mixed water is fed, reducing biochemically said inorganic compounds by means of activated sludge recycled from a settler and oxidizing biochemically the organic matter, delivering the mixture of said industrial and municipal sewage with the activated sludge from the unaerated tank to a settler and returning the activated sludge adapted to said inorganic oxygen-containing compounds to said unaerated tank, delivering the mixture of the industrial waste water and the municipal sewage from the settler to a stage for the aerobic biochemical oxidation of residual organic matter to precipitate and remove microflora from the mixed water, the activated sludge being returned to the stage of the aerobic biochemical oxidation, and delivering the excess activated sludge available from the settler arranged beyond said unaerated tank and the excess microflora from the settler arranged beyond the stage of the aerobic biochemical oxidation to said unaerated tank.

9. A method for biochemical treatment of industrial waste water containing chromates, which comprises mixing said industrial waste water with municipal sewage containing organic matter, purifying by mechanical means said municipal sewage from contaminants present therein, feeding the mixed water to an unaerated tank, the mixing of the industrial waste water and the municipal sewage being effected so that biological oxygen demand of the mixed water being fed to said unaerated tank exceeds the amount of oxygen in said chromates by not less than 20 mg/l in said unaerated tank into which the mixed water is fed, reducing biochemically said chromates by means of activated sludge recycled from a settler and oxidizing biochemically the organic matter, delivering the mixture of said industrial and municipal sewage with the activated sludge from the unaerated tank to a settler and returning the activated sludge adapted to said inorganic oxygen-containing compounds to said unaerated tank, delivering the mixture of the industrial waste water and the municipal sewage from the settler to a stage for the aerobic biochemical oxidation of the residual organic matter to precipitate and remove microflora from the mixed water, the activated sludge being returned to the stage of the aerobic biochemical oxidation, and delivering excess activated sludge available from the settler arranged beyond said unaerated tank and the excess microflora from the settler arranged beyond the stage of the aerobic biochemical oxidation to said unaerated tank.

10. A method as claimed in claim 1, wherein when said inorganic compounds are chromates, the value of pH of the mixed water in the settler after passing the unaerated tank is maintained at 9.5–10.

11. A method as claimed in claim 9, wherein the value of pH of the mixed water after passing the unaerated tank is maintained at 9.5–10.

* * * * *